June 8, 1965    W. P. HAZEL    3,187,604
TORSIONAL VIBRATION DAMPER
Filed July 12, 1962    2 Sheets-Sheet 1

INVENTOR.
William Palmer Hazel
BY
E.W.C.Christen
ATTORNEY

June 8, 1965  W. P. HAZEL  3,187,604
TORSIONAL VIBRATION DAMPER
Filed July 12, 1962  2 Sheets-Sheet 2
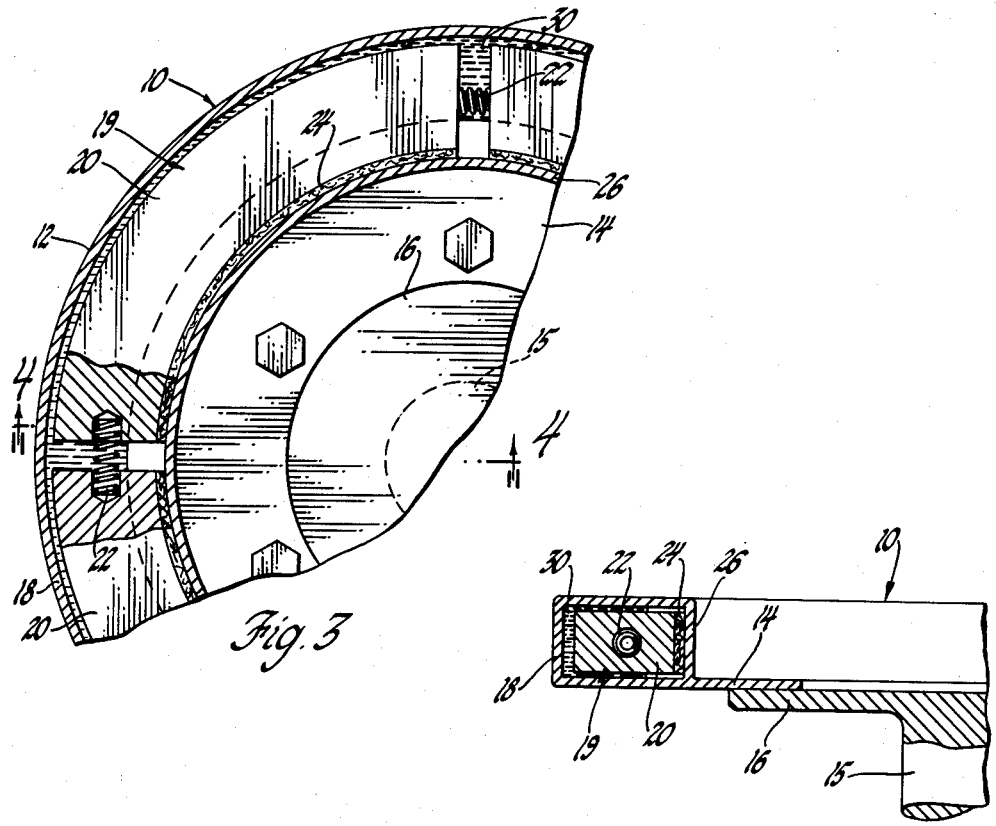
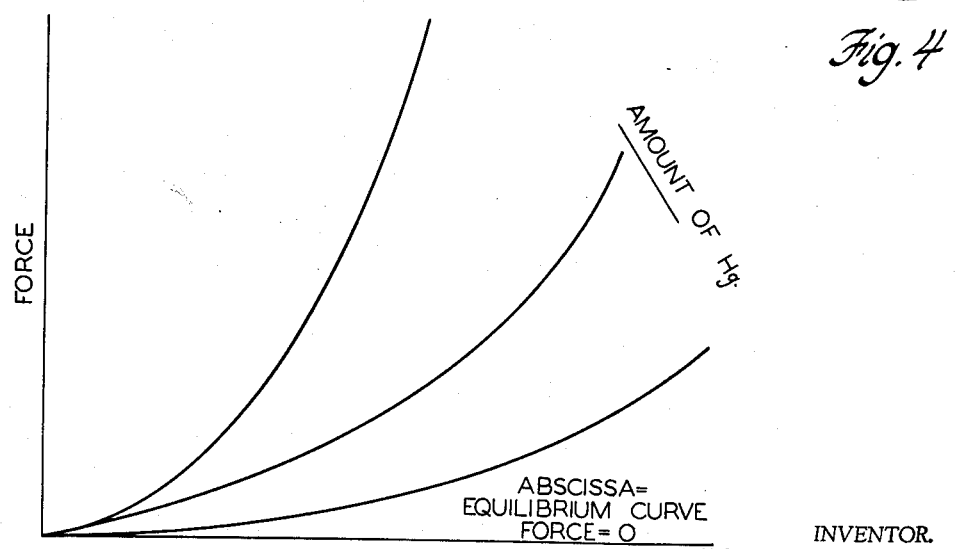
INVENTOR.
William Palmer Hazel
BY
ATTORNEY United States Patent Office 3,187,604
Patented June 8, 1965

3,187,604
TORSIONAL VIBRATION DAMPER
William P. Hazel, Livonia, Mich., assignor to General Motors Corporation, Detroit, Mich., a corporation of Delaware
Filed July 12, 1962, Ser. No. 209,379
5 Claims. (Cl. 74—574)

This invention relates to torsional vibration dampers and more particularly belongs to the class of torsional vibration dampers employing dry friction damping in the dissipation of the energy of the vibrating system.

Dampers and absorbers are used widely for the control of torsional vibration of internal combustion engines. The most common absorber is the viscous-damped, untuned auxiliary mass unit. However, before the advent of silicone oil with its chemical stability and relatively constant viscosity, the damper most commonly used for absorbing torsional vibrational energy was the dry friction or Lanchester damper. This damper commonly employs a pair of heavy flywheel members in face to face spaced relationship. A shaft subject to torsional vibrations carries a plate sandwiched between the two flywheels which are each journaled on a hub of the plate member. A friction material on both sides of the plate engages the flywheels which are urged together by loading springs. The damping is determined by the spring tension and the coefficient of friction at the sliding interfaces.

This type of damper has many weaknesses for which reason the viscous type damper has assumed prominence. For example, the dry-friction-based Lanchester damper requires frequent adjustments as the friction material wears to maintain a constant braking force.

It is the purpose of this invention to overcome these defects yet retain some of the advantages of dry friction damping not found in viscous type dampers.

In the torsional vibration of rotating machinery, the exciting torques and force generally occur at the same frequency as the rotational speed or at multiples of this frequency. Thus, an engine having a torsional vibration in a crankshaft at a frequency four times the rotational speed would be considered a fourth order vibration. The most effective absorber would be one tuned to absorb energies of this order. However, where the machine has several orders of vibration, as is most often the case, it is generally found that the untuned absorber produces better overall results. Obviously, the untuned absorber will have greater energy absorbing capabilities for certain orders of vibration than it will for others. This is because the damping force is constant in the absorber and is not made variable according to the speed of the rotating body.

It is the object of the present invention to provide a torsional vibration damper of the untuned variety which is capable of variable damping forces in accordance with the speed of the vibrating system.

It is also an object of this invention to provide a dry friction damper wherein the effect on the damping forces of wear of the friction material is minimized.

A further object is to provide a damper that does not rely on spring forces to maintain the friction material in braking contact with the excited mass.

In accordance with this invention, the vibration damper unit includes an annular housing being adapted to be connected to a vibrationally disturbed system. A mass unit is symmetrically disposed within the annular interior of the housing and is characterized by being inwardly radially movable in response to the centrifugal force generated by the rotating system. A heavy liquid medium partially fills the void space existing between the mass unit and the interior walls of the housing. The liquid medium is characterized by having a specific gravity greater than that of the mass unit whereby upon rotation of the housing the centrifugal force acting on the mass unit and the liquid medium is unequal resulting in a net positive radially inwardly directed force acting on the mass unit causing it to move inwardly. Friction shoes carried by the mass unit are moved against the rotating housing wall applying the damping force.

Other advantages of this invention will become apparent by references to the descriptions and drawings wherein:

FIGURE 3 is a broken sectional plan view of the damping unit under dynamic conditions;

FIGURE 4 is a view of FIGURE 3 taken along the lines 4—4; and

FIGURE 5 is a force versus r.p.m. curve showing the effect when variable amounts of liquid are employed.

Figure 1:
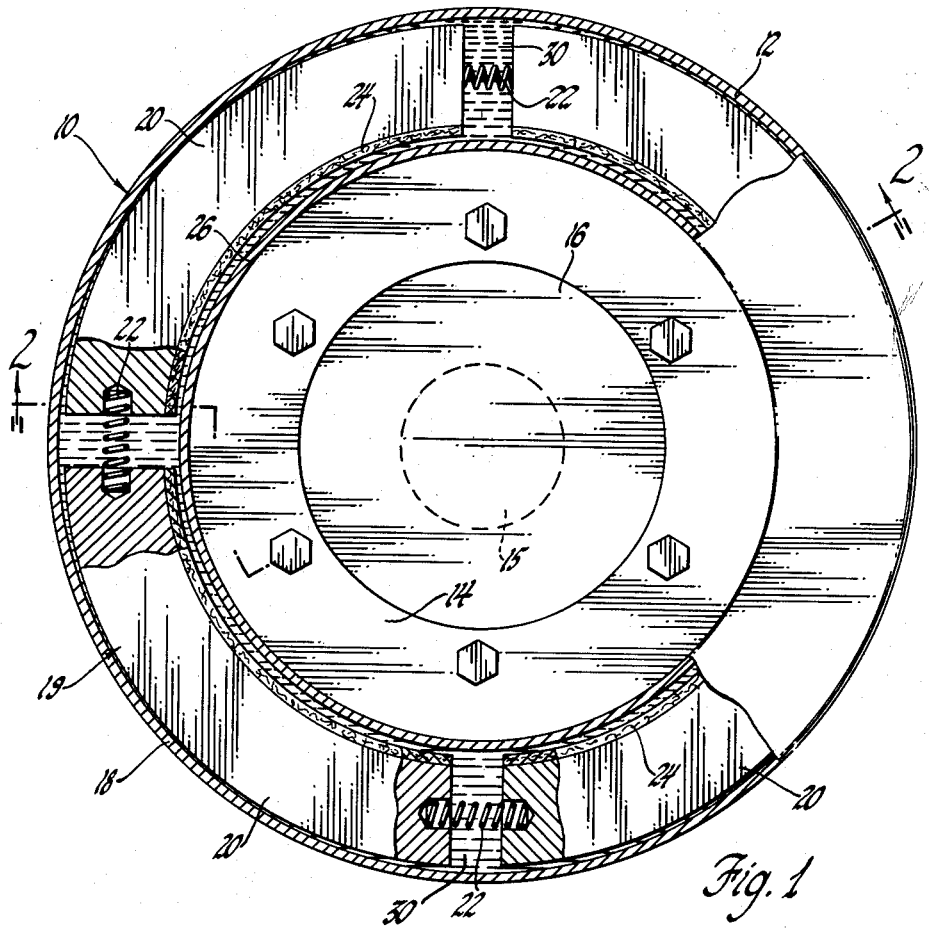
FIGURE 1 is a sectional planned view of the damper unit.

Referring more particularly to the drawings, the torsional vibration unit 10 includes a housing 12 having a flange portion 14 provided with suitable fasteners for mounting the damper to the vibrationally disturbed system which is here represented by a vertically positioned shaft 15 having a plate 16. The invention is not intended to be limited to operation in a horizontal plane but is shown in this position merely for convenience. The housing 12 includes the annular body portion 18 shown generally of rectangular cross-section wherein the walls of the annulus are formed integral with flange 14 or are otherwise closed to provide a sealed chamber. The annular chamber 18 may be of shapes other than rectangular such as a torus type ring.

Disposed within the housing is a mass unit 19 represented collectively by arcuate weights 20 and which acts as a free body with respect to the housing in that a relative circumferential motion is permitted. The arcuate weights 20 are of generally rectangular shape and occupy a volume of the annulus 18 of critical proportions as will hereinafter appear. Coil springs 22 mounted between the ends of each arcuate weight link the weights together by biasing them as a single mass unit in a radially outwardly direction during operational speeds of the shaft.

Figure 2:
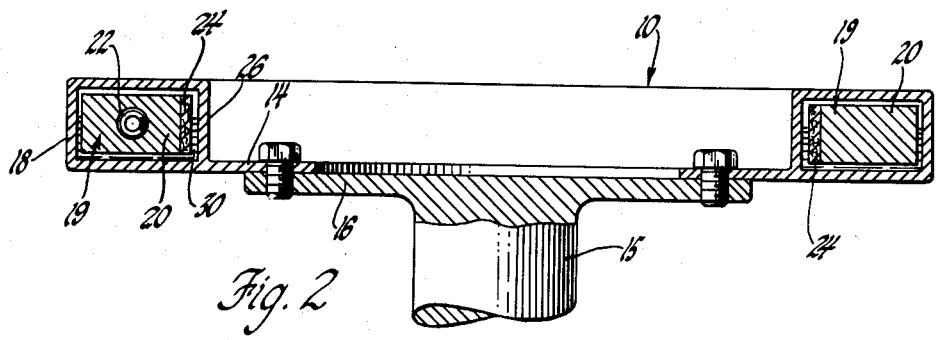
FIGURE 2 is a sectional view of FIGURE 1 taken along the lines 2—2.

It is to be noted that friction shoes 24 are bonded or otherwise secured to the inner peripheral surfaces of the arcuate weights. The frictional shoes 24 may be of any well known friction material such as brake shoe material, and are spaced radially outwardly from the inner wall 26 of annulus 18 when the damper is idling or stopped. A liquid medium 30 fills a portion of the void space remaining between the mass unit 19 and annulus 18 as clearly shown in FIGURE 2. The liquid medium 30 must be of a specific gravity greater than that of the mass unit 19 as represented by arcuate weights 20, springs 22 and friction shoes 24. Mercury has been found suitable for most applications; however, costs may require that a cheaper and lighter fluid be substituted; in which case the arcuate weights 20 would have to be constructed of a material of a specific gravity probably less than that of steel to insure effective operation.

As shaft 15 begins to rotate a centrifugal force will be generated proportional to the specific gravity of the liquid medium 30 and the mass unit 19. The device operates on the theory that a substance of greater specific gravity will be forced radially outwardly further from the axis of rotation than any substance of less specific gravity. A similar principle is used in centrifuging. As the housing body 18 rotates, the heavier fluid medium 30 will flow radially over the weights 20 displacing them inwardly against the force of the springs 22 and the centrifugal force acting on the weights 20. At some known speed, depending on the variables of the system, the friction shoes 24 will frictionally engage the rotating housing inner wall 26 to begin the damping action as seen in FIGURES 3 and 4. The maximum force that can be transmitted through each friction shoe interface of the damper is the product of the normal force and the coefficient of friction at the interface; the maximum total force for the damper is the summation of forces over the number of interfaces. Consequently, the restoring force which is used to balance out the excitation forces is variable; becoming increasingly greater as the shaft speed increases.

For example, it may be calculated in advance what the fundamental mode of vibration for the system is, that is, the vibrational mode having the lowest natural frequency. Then by manipulation of the damper variables, such as changing the quantity of fluid medium 30 as diagrammatically illustrated in FIGURE 5, the initial braking can be started at the shaft revolution characteristic of that mode of vibration.

Some incidental damping action similar to that of a fluid viscous damper also takes place by the reversible radial flow of the liquid medium 30 around the mass unit 19. Also, since the mass unit 19 is torsionally unrestrained for all practical purposes up until the time when frictional damping occurs, the weights and the liquid rotate together at practically the operational speed of the shaft, but when frictional contact occurs between the housing and the mass unit 19, there is a greater tendency for its inertial speed to change that of the liquid hence the sliding of the weights 20 circumjacent the housing inner wall tends to dissipate further vibrational energies by the hysteresis effect produced by plowing through the heavier fluid.

Having now described the invention and the best mode of operation, it is to be noted that minor changes may be made without departing from the spirit of the invention as described in the appended claims.

What is claimed is:

1. A vibration damper adapted to be mounted on a rotatable shaft comprising a fluid tight annular housing member connectable to said shaft and rotatable therewith;
   a mass unit symmetrically disposed within said housing, said mass unit being responsive to centrifugal force generated by said rotating shaft to change its radial position uniformly and being torsionally unrestrained to permit circumferential movement thereof relative to said housing;
   friction means connected to the inner surface of said mass unit and being circumjacent the inner wall of said annular housing; and
   a metered quantity of liquid partially filling the space between said mass unit and said annular housing, said mass unit having a specific gravity less than that of said liquid whereby the centrifugal force generated by the rotating shaft acts on said mass unit and said liquid in unequal proportions resulting in a net positive inwardly radially directed force acting on said mass unit causing same to move said friction means into friction damping engagement with said annular housing during which time relative circumferential movement between the mass unit and liquid is permitted producing a viscous damping action therebetween.

2. A vibration damper adapted to be mounted on a rotatable shaft comprising a fluid tight annular housing member connectable to said shaft and rotatable therewith;
   arcuate weights symmetrically arranged and received within said housing and being radially positionable uniformly therein in response to the centrifugal force generated by said shaft and being torsionally unrestrained to permit circumferential movement thereof relative to said housing;
   spring means acting on said weights to maintain their symmetrical position;
   arcuate friction means connected to said arcuate weights and lying circumjacent said annular housing inner wall; and
   a metered quantity of liquid partially filling the space between said weights and said annular housing, said liquid having a specific gravity in excess of that of said weights whereby the centrifugal force generated by are rotating shaft acts on said liquid and weights in unequal proportions resulting in a net positive inwardly radially directed force acting on said weights causing same to move said friction means into friction damping engagement with said annular housing during which time relative circumferential movement between the weights and liquid is permitted producing a viscous damping action therebetween.

3. The device as described in claim 2 wherein said liquid has a specific equal to that of mercury.

4. A vibration damper adapted to be mounted on a rotatable shaft comprising a fluid tight annular housing member connectable to said shaft and rotatable therewith;
   arcuate weights symmetrically disposed within said annular housing, said weights being responsive to centrifugal force generated by said rotating shaft to change radial position uniformly and being torsionally unrestrained to permit circumferential movement thereof relative to said housing;
   spring means mounted between said weights, said spring means cooperating to bias said weights collectively in a radially outwardly direction;
   arcuate friction shoes attached to the inner surface of each said weights and being circumjacent the inner wall of said annular housing; and
   a metered quantity of liquid partially filling the space between said weights and said annular housing, said weights having a specific gravity less than that of said liquid whereby the centrifugal force generated by said rotating shaft acts on said weights and said liquid in unequal proportions resulting in a net positive inwardly radially directed force acting on said weights causing same to move said friction shoes into friction damping engagement with said housing during which time relative circumferential movement between the weights and liquid is permitted producing a viscous damping action therebetween.

5. The device as described in claim 4 wherein said arcuate weights are formed of a material having a specific gravity less than that of steel.

References Cited by the Examiner

UNITED STATES PATENTS 1,815,807  7/31  Stamm et al. _____ 74—574
2,258,157  10/41  Kohl.
2,285,652  6/42  Flickinger.

BROUGHTON G. DURHAM, *Primary Examiner.*

UNITED STATES PATENT OFFICE
CERTIFICATE OF CORRECTION

Patent No. 3,187,604 June 8, 1965

William P. Hazel

It is hereby certified that error appears in the above numbered patent requiring correction and that the said Letters Patent should read as corrected below.

Column 4, line 28, after "specific" insert -- gravity --.

Signed and sealed this 7th day of December 1965.

(SEAL)
Attest:

ERNEST W. SWIDER
Attesting Officer

EDWARD J. BRENNER
Commissioner of Patents